(12) United States Patent
Coronado et al.

(10) Patent No.: US 8,769,147 B2
(45) Date of Patent: *Jul. 1, 2014

(54) METHOD, APPARATUS AND SYSTEM TO DYNAMICALLY MANAGE LOGICAL PATH RESOURCES

(71) Applicant: International Business Machines Corporation, Armonk, NY (US)

(72) Inventors: Juan A. Coronado, Tucson, AZ (US); Roger G. Hathorn, Tucson, AZ (US); Bret W. Holley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/743,466

(22) Filed: Jan. 17, 2013

(65) Prior Publication Data

US 2013/0138833 A1 May 30, 2013

Related U.S. Application Data

(63) Continuation of application No. 12/022,696, filed on Jan. 30, 2008, now Pat. No. 8,392,610.

(51) Int. Cl.
*G06F 15/173* (2006.01)
*G06F 3/00* (2006.01)
*G06F 12/02* (2006.01)
*G06F 12/06* (2006.01)

(52) U.S. Cl.
USPC ............... 709/238; 709/239; 709/240; 710/3; 711/1; 711/2

(58) Field of Classification Search
USPC ............... 709/238, 239, 240; 710/3; 711/1, 2
See application file for complete search history.

(56) References Cited

U.S. PATENT DOCUMENTS

| 4,347,498 | A | * | 8/1982 | Lee et al. ...................... 370/408 |
| 4,587,651 | A | * | 5/1986 | Nelson et al. ................. 370/405 |
| 4,625,081 | A | * | 11/1986 | Lotito et al. ............... 379/88.26 |
| 4,805,172 | A | * | 2/1989 | Barbe et al. .................... 370/384 |
| 4,839,887 | A | * | 6/1989 | Yano ............................. 370/396 |
| 5,084,816 | A | * | 1/1992 | Boese et al. ................. 714/4.21 |
| 5,414,708 | A | * | 5/1995 | Webber et al. ................ 370/445 |
| 5,506,956 | A | * | 4/1996 | Cohen ............................ 714/6.1 |
| 5,577,023 | A | * | 11/1996 | Marum et al. ................ 370/225 |

(Continued)

FOREIGN PATENT DOCUMENTS

| JP | 7084936 A | 3/1995 |
| JP | 08130542 A2 | 1/2005 |

(Continued)

OTHER PUBLICATIONS

S. Herzog, "Signaled Preemption Priority Policy Element (RFC3181)", Internet RFCs, Network Working Group, Oct. 1, 2001.

(Continued)

*Primary Examiner* — Ranodhi Serrao
(74) *Attorney, Agent, or Firm* — Griffiths & Seaton PLLC

(57) ABSTRACT

System, apparatus, and methods for dynamically managing logical path resources are provided. The logical path resources are managed by adding, removing, and establishing logic paths based on specified priority schemes associated with the logical path resources. Information associated with the logical path resources is updated in a logical path resource table.

20 Claims, 5 Drawing Sheets

(56) References Cited

U.S. PATENT DOCUMENTS

| | | | |
|---|---|---|---|
| 6,081,511 A * | 6/2000 | Carr et al. | 370/256 |
| 6,487,289 B1 | 11/2002 | Phan et al. | |
| 6,728,205 B1 * | 4/2004 | Finn et al. | 370/217 |
| 6,956,821 B2 | 10/2005 | Szviatovszki et al. | |
| 6,963,575 B1 * | 11/2005 | Sistanizadeh et al. | 370/404 |
| 7,230,915 B2 * | 6/2007 | Kobayashi | 370/226 |
| 7,320,083 B2 * | 1/2008 | Davies et al. | 714/3 |
| 7,433,966 B2 * | 10/2008 | Charny et al. | 709/239 |
| 7,437,604 B2 * | 10/2008 | Davies et al. | 714/5.11 |
| 7,505,751 B1 * | 3/2009 | Backes | 455/332 |
| 7,619,987 B2 * | 11/2009 | Mitsumori | 370/254 |
| 7,630,300 B2 * | 12/2009 | Warren et al. | 370/222 |
| 2001/0026384 A1 * | 10/2001 | Sakano et al. | 359/124 |
| 2002/0067693 A1 * | 6/2002 | Kodialam et al. | 370/216 |
| 2003/0158964 A1 * | 8/2003 | Kobayashi | 709/238 |
| 2004/0213564 A1 * | 10/2004 | Sakano et al. | 398/12 |
| 2005/0251548 A1 | 11/2005 | Hayashi et al. | |
| 2005/0270980 A1 * | 12/2005 | McGee | 370/238 |
| 2005/0283552 A1 | 12/2005 | Kobashi et al. | |
| 2007/0070886 A1 * | 3/2007 | Zirin | 370/225 |
| 2008/0025208 A1 * | 1/2008 | Chan | 370/217 |
| 2009/0193142 A1 | 7/2009 | Coronado et al. | |
| 2010/0034098 A1 * | 2/2010 | Wang et al. | 370/242 |

FOREIGN PATENT DOCUMENTS

| | | |
|---|---|---|
| JP | 2005321959 A | 11/2005 |
| JP | 2006004193 A | 1/2006 |
| JP | 2006012169 A | 1/2006 |
| JP | 2006119741 A | 5/2006 |
| JP | 2006195977 A | 7/2006 |

OTHER PUBLICATIONS

Elliott et al., "Method and Apparatus for Data Flow Control on a Serial I/O Channel"; TDB n11 01-91 p. 269-271; Apr. 1, 1991.

* cited by examiner

US 8,769,147 B2

METHOD, APPARATUS AND SYSTEM TO DYNAMICALLY MANAGE LOGICAL PATH RESOURCES

REFERENCE TO RELATED APPLICATIONS

This application is a continuation of U.S. patent application Ser. No. 12/022,696, filed on Jan. 30, 2008, the contents of which are incorporated herein by reference.

BACKGROUND OF THE INVENTION

1. Field of the Invention

The present invention relates to a method, system, and article of manufacture to dynamically manage logical path resources.

2. Description of the Related Art

In certain computing environments, a host computer may communicate with a storage control unit, where the storage control unit controls physical storage. The physical storage that is controlled by the storage control unit may be represented logically as a plurality of logical path resources within the storage control unit. Applications in the host computer may perform input/output (I/O) operations with respect to the logical path resources of the storage control unit. For example, an application in the host computer may write to logical path resources of the storage control unit. The storage control unit may maintain a correspondence between the logical path resources and storage media in the physical storage via logical and physical volumes. While data may be physically written to the storage media in the physical storage under the control of the storage control unit, as far as an application in the host computer is concerned, the application performs write operations with respect to the logical path resources in the storage control unit.

SUMMARY OF THE INVENTION

In accordance with the present invention, a system, apparatus, and method for dynamically managing logical path resources based on associated priority schemes. With the system and method of the present invention, a requestor (e.g., host) may designate a priority scheme to a logical path being accessed. Such a system is especially applicable when the condition of "out of resources" has been reached for a port. With this system, logical path resources may be managed based on priority schemes associated with them. Also, it is not necessary for a control unit to have reached its maximum number of logical paths per port before removing, replacing, and establishing logical paths. Accordingly, a new logical path may be established at any time in accordance with specified priority schemes associated with logical path resources.

In certain embodiments, the invention relates a method to dynamically manage logical path resources. The method includes receiving a request from a requestor to establish a logical path; receiving a request from the requestor to designate a priority scheme for the logical path, the designated priority scheme comprising a priority; determining whether there is an available logical path resource; performing a path priority operation to establish the logical path based on the designated priority scheme; and updating information associated with logical path resources in a logical path resource table.

In certain embodiments, the invention relates to a system that includes a processor and a computer-usable medium embodying computer program code. The computer program code comprises instructions executable by the processor and configured for receiving a request from a requestor to establish a logical path; receiving a request from the requestor to designate a priority scheme for the logical path, the designated priority scheme comprising a priority; determining whether there is an available logical path resource; performing a path priority operation to establish the logical path based on the designated priority scheme; and updating information associated with logical path resources in a logical path resource table.

In certain embodiments, the invention relates to a computer-usable medium embodying computer program code. The computer program code comprises computer executable instructions configured for sending, by a host to a storage controller, a request from the host to establish a logical path; sending, by the host to the storage controller, a request to designate a priority scheme for the logical path, the designated priority scheme comprising a priority; determining by the storage controller whether there is an available logical path resource; performing by the storage controller a path priority operation to establish the logical path based on the designated priority scheme; and updating by the storage controller information associated with logical path resources in a logical path resource table.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

In the following description, reference is made to the accompanying drawings which form a part hereof and which illustrate several embodiments. It is understood that other embodiments may be utilized and structural and operational changes may be made.

Figure 1:
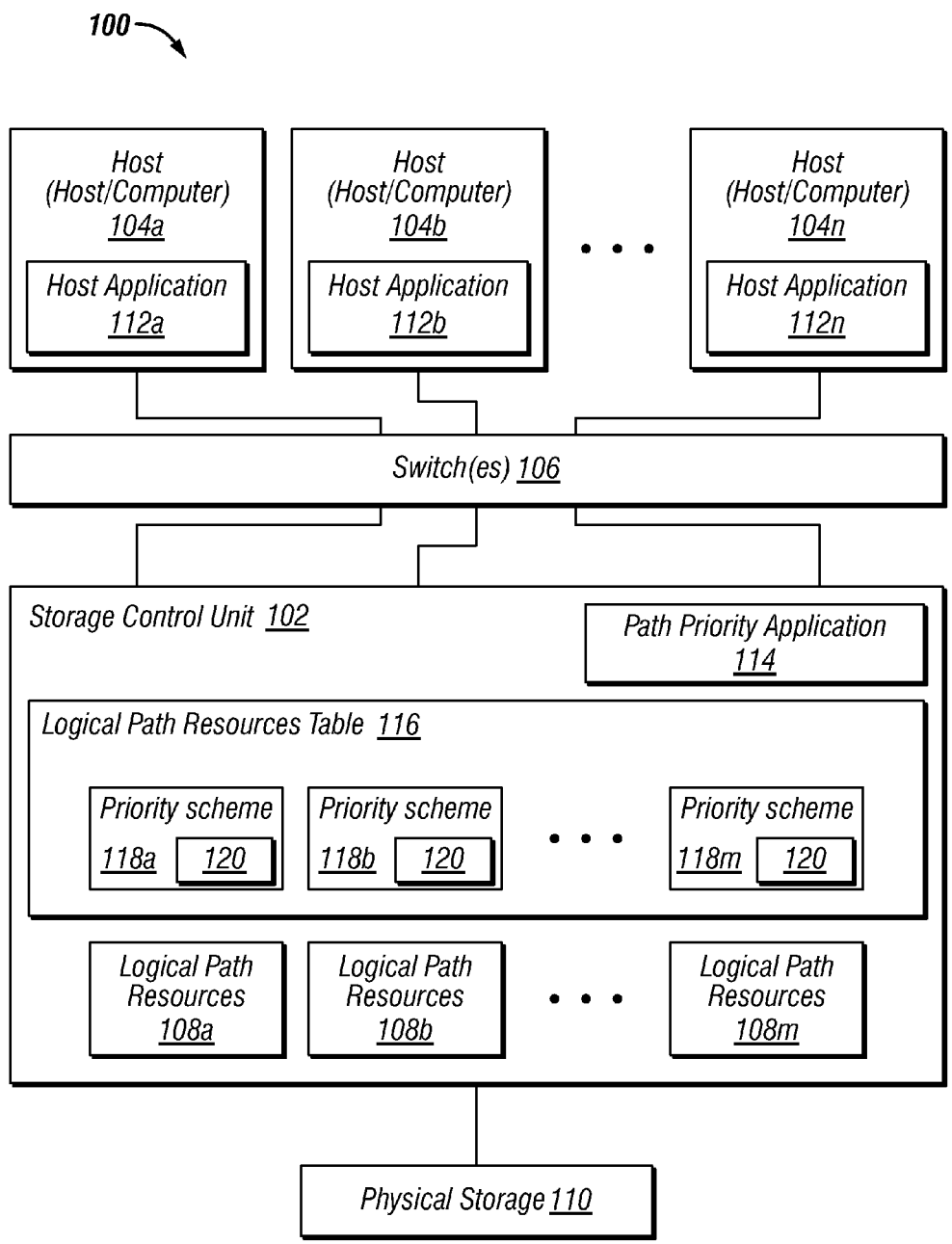
FIG. 1 is a block diagram illustrating a computing environment in which certain embodiments are implemented.

FIG. 1 illustrates a block diagram of a computing environment 100 in accordance with certain embodiments. The computing environment 100 includes a storage control unit 102 that is coupled to a plurality of hosts 104a, 104b . . . 104n over one or more switches 106. The storage control unit 102 includes logical path resources 108a, 108b . . . 108m that map to physical subsystems corresponding to a physical storage 110 that is controlled by the storage control unit 102. The logical path resources 108a . . . 108m may comprise any plurality of logical storage systems, where each logical storage system includes at least one logical storage volume corresponding to one or more physical volumes stored in the physical storage 110. The plurality of hosts 104a . . . 104n include a plurality of host applications 112a, 112b . . . 112n that perform I/O operations with the logical path resources 108a . . . 108m.

The plurality of hosts 104a . . . 104n may comprise any suitable computational device including for example, a personal computer, a workstation, a mainframe, a hand held computer, a palm top computer, a telephony device, a network appliance, a blade computer, a storage server, etc. In certain embodiments, the hosts 104a . . . 104n comprise an IBM S/390 type computer or other computers.

The storage control unit 102 may include any suitable computational device that controls access to the physical storage 110. In certain embodiments, the storage control unit 102 may comprise an Enterprises Storage System ("ESS"), such as a TotalStorage® Enterprise Storage Server® (ESS), DS8000, DS6000, and/or a BladeCenter from IBM®. In certain embodiments, the storage control unit 102 may comprise a FICON (Fiber Connectivity) attached Tape product, VTS (Virtual Tape Server), SVC (San Volume Controller) from IBM®.

The physical storage 110 may include any suitable data storage including for example disk drives, tape drives, etc. For example, the physical storage 110 may comprise tape cartridges, optical cartridges, optical disks, magnetic disks, magnetic tapes, holographic disks, and/or combinations thereof.

In certain embodiments, the one or more switches 106 that couple the plurality of hosts 104a . . . 104n to the storage control unit 102 may comprise an Enterprise Systems Connection (ESCON) switches, a FICON (Fiber Connectivity) switches, and/or combinations thereof. In certain embodiments, for example, one or more switches 106 are configured as ESCON switches that use optical fiber technology to couple the hosts 104a . . . 104n to the storage control unit 102. In certain embodiments, for example, one or more switches 106 are configured as fibre channel (FC) switches that are compatible with fibre channel (FC) protocol. The FC switches may couple one or more hosts 104a . . . 104n to the storage control unit 102.

Although FIG. 1 illustrates a single host application per host, in certain embodiments a greater or a fewer number of host applications may execute in each host. Additionally, the number of host applications 112a . . . 112n that run off the plurality of hosts 104a . . . 104n may be different from the number of hosts 104a . . . 104n.

A configuration of logical path resources 108a . . . 108m in the storage control unit 102 may change because of additions, removals, or modifications to the logical path resources 108a . . . 108m. For example, a host, such as host 102b, may establish communication with logical path resources 108a . . . 108m. But, during certain modifications to the logical path resources 108a . . . 108m of the storage control unit 102, such as addition of a logical path resource when no path resources are available, may cause a failure of I/O operations that are sent from the host computer (e.g., host 104b) to the storage control unit 102.

For example, to establish a logical path, host 104b may send an "establish logical path" message for each logical subsystem the host 104b wants to access. Once the host 104b establishes a logical path, the host 104b may access all the devices in a logical subsystem (e.g., logical path resources 108a . . . 108m). As long as the maximum number of logical paths per port has not been reached, host 104b may establish a new logical path on that port. However, when a maximum number of logical paths per port are reached, the host 104b may not be able to establish new logical paths on that port. When this occurs, host 104b may receive an "out of resources" status indication for each establish logical path rejection.

Additionally, a host, such as host 104a, may already have established a logical path. As such, host 104b may receive an "out of resources" status indication even though not all the logical path resources are being used at the same time. For example, in Escon and Ficon architecture, the connectivity requirements may require that logical paths be explicitly established and removed via operator control. As such, the number of logical path resources that are required to be established is the sum total of all logical paths that can be used by the system. However, there are cases when not all logical path resources are being used at the same time. In these cases, certain work loads only run for a short, defined periods of time. But, because the logical path resources for these jobs must be allocated and remain utilized all the time, even though for example the jobs are only used for a short period of time, host 104b receives an "out of resources" status indication.

Further, to add a new logical path, an existing logical path from that port may have to be removed. Once the logical path has been removed from the port, a host (e.g., host 104b) may establish the new logical path. However, in certain cases, the establishment of a new logical path from host 104b may fail again. The failure may occur because another host (e.g., an intervening host 104c) has established a logical path. In this situation, the intervening host 104c steals the logical path slot made available to host 104b. Host 104b may have critical data (i.e., financial data) that must be writing to storage 110. For example, host 104b may be attempting a backup operation in a critical window of time while transaction processing is at a minimum. But, because host 104c having non-critical data has stolen the logical path host 104b cannot complete its job. The result is the system has no logical path resources at the control unit for host 104b.

Applicants' overcome these problems and more by dynamically managing the logical path resources. Applicants' embodiments allow for dynamic connectivity of logical paths as they are needed by the system. Applicants' embodiments permit the resources for establishing logical paths to be greatly reduced. Applicants' embodiments allow the system to dynamically manage the logical paths by adding, removing, and reestablishing logical paths automatically. Applicants' embodiments allow the system to dynamically remove and establish logical paths based on a priority scheme.

For example, in certain embodiments, when a configuration change of the logical path resources 108a . . . 108m occurs within the storage control unit 102, a path priority application 114 implemented in the storage control unit 102 is executed. In certain embodiments, the path priority application 114 is implemented automatically as a result of an "out of resources" condition. In certain embodiments, the path priority application 114 is implemented automatically based on a request to designate or give a priority scheme to one or more logical path resources 108a . . . 108m.

As illustrated in FIG. 1, for example, the storage control unit 102 comprises a path priority application 114 and a logical path resources table 116 having a priority scheme 118a . . . 118m for each logical path resources 108a . . . 108m. When a channel establishes a logical path, the host 104a . . . 104n specifies a priority scheme 118f having a priority for the logical path (i.e., critical priority, normal, non-critical priority). The priority scheme 118 specified is listed in the logical path resources table 116. The path priority application 114 manages the adding, removing, establishing, and reestablishing of the logical paths based on the priority schemes 118a ... 118m associated with the logical path resources 108a ... 108m. The path priority application 114 also updates the priority schemes 118a ... 118m associated with the logical path resources 108a ... 108m in the logical path resources table 116.

In certain embodiments, the path priority application 114 is also referred to as a path priority system and may be implemented in software, hardware, firmware or any combination thereof. Executing the path priority application 114 allows dynamic management of the logical path resources 108a ... 108m within the computing environment 100. By executing the path priority application 114, a host (e.g., hosts 104a ... 104n) may specify and provide a priority scheme 118a ... 118m to a logical path resources 108a ... 108m. The path priority application 114 may be applicable when the condition of "out of resources" has been reached for a port. Also, it is not necessary for the storage control unit 102 to have reached its maximum number of logical paths per port before implementing path priority application 114. For example, in certain embodiments, path priority application 114 may be applicable when the storage control unit 102 detects that a host, such as host 104a ... 104n, gives a priority scheme 118a ... 118m to be associated with a logical path resources 108a ... 108m.

Figure 2:
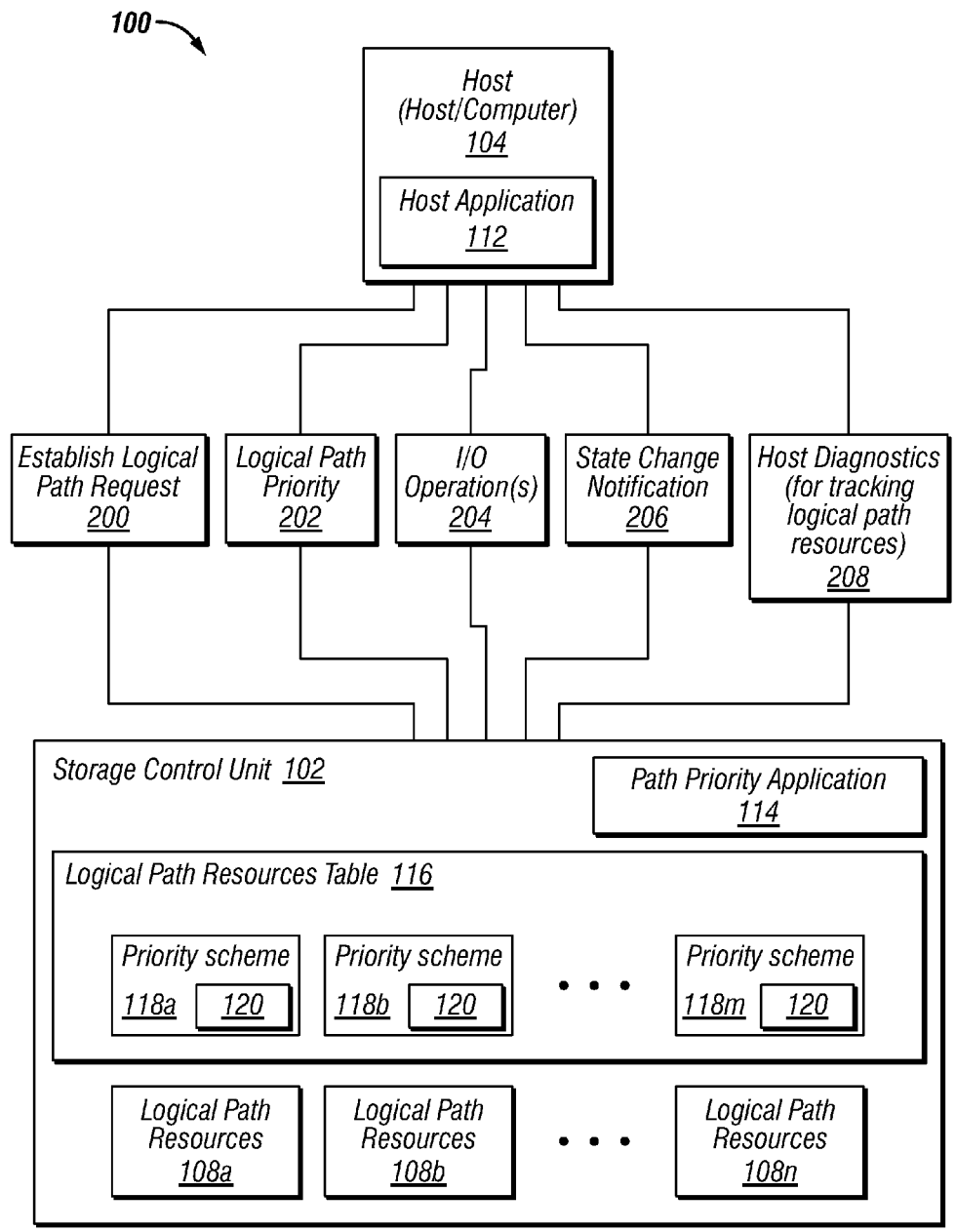
FIG. 2 a block diagram illustrating in more detail the implementation of certain embodiments of the computing environment of FIG. 1.

FIG. 2 illustrates a block diagram of a computing environment 100 in accordance with certain embodiments to dynamically manage logical path resources. More specifically, an exemplary host 104, selected from the hosts 104a ... 104n, may include an exemplary host application 112, selected from the hosts 112a ... 112n. The host application 112 may send an "establish logical path" request 200 to the storage control unit 102, where the "establish logical path" request 200 seeks to access a logical path resources 108a ... 108m of the storage control unit 102. The host application 112 may send a "designate logical path priority" request 202 that includes a priority scheme 118a ... 118m to be associated with or given to a logical path resources 108a ... 108m being accessed. For example, host 102a sends (via host application 112a) a "designate logical path priority" request 202 to storage control unit 102. The "designate logical path priority" request 202 includes a priority scheme 118 having a priority 120 given to the logical path. The priority 120 may include a critical priority, a normal priority, or a non-critical priority.

In certain embodiments, the host application 112a may send a "designate logical path priority" request 202 at substantially the same time the "establish logical path" request 200 is sent. In other embodiments, the host 102a via host application 112a may send the "designate logical path priority" request 202 after the 'establish logical path' request 200 is sent. In certain embodiments, the "designate logical path priority" request 202 may be sent concurrently with the 'establish logical path' request 200.

The path priority application 114 implemented in the storage control unit 102 accepts the "establish logical path" request 200 and/or the "designate logical path priority" request 202. The path priority application 114 checks the logical path resources table 116 to determine if the logical path resources indicated by the "establish logical path" request 200 and/or the "designate logical path priority" request 202 is available.

To determine the availability of the logical path resources indicated by the "establish logical path" request 200 and/or the "designate logical path priority" request 202, the path priority application 114 may refer to information stored or listed in the logical path resources table 116 implemented in the storage control unit 102. The logical path resources table 116 may comprise a data structure that records which of the logical path resources 108a ... 108m are available for access, which of the logical path resources 108a ... 108m have a priority scheme 118a ... 118m associated with them, and the priority 120 given to the logical path by host 104a ... 104n. In certain embodiments, the logical path resources table 116 may comprise an array of pointers, where each pointer can reference logical path resources.

Once a logical path between a host application 112a ... 112n and logical path resources 108a ... 108m is established as a result of the successful completion of the "establish logical path" request 200 and/or the "designate logical path priority" request 202, the host application 112a ... 112n may perform I/O operations 204 with respect to the logical path resources 108a ... 108m with which the logical path is established.

In certain embodiments, the configuration of the logical path resources 108a ... 108m may change via additions, removals, or modifications to the logical path resources 108a ... 108m. For example, new logical path resources may be added. If a host 104a ... 104n attempts to establish a logical path via an "establish logical path" request 200 messages and/or the "designate logical path priority" request 202 messages when no logical path resources are available, such an operation may result in generation of an "out of resources" condition. To prevent such an "out of resources" condition from occurring, in response to a change in the configuration of the logical path resources 108a ... 108m, the path priority application 114 may perform a path priority operation.

In certain embodiments, when performing the path priority operation a host application 112a ... 112n may give or provide a priority scheme 118 having a priority 120 to be associated with or given to a logical path. The path priority application 114 may perform a path priority operation by looking up or referring to the logical path resources table 116 for the priority scheme 118a ... 118m associated with or given to a logical path resources 108a ... 108m. The priority scheme 118a ... 118m includes a priority 120 associated with a logical path. The priority 120 may include any one of a critical priority, normal priority, and non-critical priority given to or associated with logical path resources 108a ... 108m. Based on the priority 120 associated with or given to the logical path, the path priority application 114 may replace an existing logical path having a priority scheme with a new priority scheme.

For example, an exemplary host, such as host 104a, has already designated priority schemes 118a ... 118m to logical path resources 108a ... 108m where four logical paths have a priority 120 of critical and another four logical paths have a priority 120 of non-critical. Another exemplary host, such as host 104b, is requesting to establish new logical paths with designated priority schemes 118. Host 104b (e.g., via host application 112) provides or designates a priority 120 of critical to be associated with the new established logical paths. The path priority application 114 refers to the logical path resources table 116 to determine the priority schemes 118a ... 118m associated with the logical path resources 108a ... 108m. Because host 104a has four logical paths listed with a priority 120 of non-critical, the path priority application 114 executes a path priority operation to remove the existing host 104a four logical paths having priority of non-critical, replace them, and establish new logical paths with host 104b having a priority 120 of critical. The path priority application 114 updates the information in the logical path resources table 116. Thus, in certain embodiments, the path priority application 114 automatically establishes new logical paths for host 104*b* even though all logical paths are currently being occupied by host 104*a*.

In certain embodiments, the path priority application 114 may replace an existing priority scheme 118*a* . . . 118*m* with a previous priority scheme. For example, when host 104*b* has completed its job, host 104*b* removes the logical paths. The path priority application 114 may allow another host, such as host 104*a*, to re-establish the removed paths. The path priority application 114 would notify (via state change notification) host 104*a* when the paths are removed by host 104*b*, and then host 104*a* comes back and re-establishes the paths. Also, in certain embodiments, host 104*a* establishes its previously removed logical paths with its previously designated priority scheme. Thus, in certain embodiments, a host, such as host 104*a*, may automatically re-establish its previously removed logical paths with its previously designated priority scheme once host 104*b* has completed its job.

As illustrated, in certain embodiments, the priority scheme 118 specified or designated by host 104*a* . . . 104*n* includes a priority 120, such as any one of a critical priority, normal priority, and non-critical priority. The path priority application 114 dynamically manages the logical path resources 118*a* . . . 118*m* using the specified or designated priority 120 in the logical path resources table 116.

For example, in certain embodiments, a logical path with a critical priority 120 specification is given the highest priority by the path priority application 114 in the logical path resources table 116. If a system, such as system 100, has no more logical path resources available, then a logical path with a non-critical priority specified in logical path resources table 116 will be removed by the path priority application 114 so that the logical path with a specified critical priority may be established. In certain embodiments, a logical path having a critical priority listed in logical path resources table 116 may not be removed in order to establish another logical path.

Also, in certain embodiments, for example, a logical path with a normal priority 120 specification is given a normal priority by the path priority application 114 in the logical path resources table 116. If a system, such as system 100, has no more logical path resources available, then a logical path with a normal priority specified in the logical path resources table 116 will not be removed, modified or changed by the path priority application 114 in order to establish another logical path. In this case, even though a host 104*a* . . . 104*n* has specified a critical priority, the path priority application 114 will not remove a logical path having a normal priority specified in the logical path resources table 116. In certain embodiments, a host 104*a* . . . 104*n* specifying a normal priority will have a logical path established by the path priority application 114 when a logical path resource 108*a* . . . 108*m* becomes available at the storage control unit 102.

In certain embodiments, for example, a logical path with a non-critical priority 120 specification is given a non-critical priority by the path priority application 114 in the logical path resources table 116. In certain embodiments, if a host 104*a* . . . 104*n* specifies a critical priority path and is attempting to establish a logical path, and the storage control unit 102 has no logical path resources 118*a* . . . 118*m* available, a logical path having a non-critical priority listed in the logical path resources table 116 will be removed by the path priority application 114 in order to accommodate the establishment of the critical path. In certain embodiments, the removed logical paths are automatically re-established by the path priority application 114 when the critical priority path has been removed.

In certain embodiments, a host, such as host 104*a* . . . 104*n*, tracks the logical path resources 108*a* . . . 108*m* via host diagnostics 208. The host 104*a* . . . 104*n* may change the designated logical path priority as many times as needed by resending a new priority scheme 118 via a "designate priority logical path" request 202. In certain embodiments, the "establish logical path" request 200 may also be sent with the new "designate priority logical path" request 202. The non-critical paths that are removed at the storage control unit 102 in order to establish critical priority paths may require host notification of the path removal. This may be accomplished by the storage control unit 102 sending a state change notification 206 to the host 104*a* . . . 104*n*, who will in turn drive or perform a test initialization to determine which logical paths are no longer established. If a logical path is removed at the storage control unit 102 and all the logical path resources 108*a* . . . 108*m* are currently utilized, then a state change notification 206 may again be driven, and the host 104*a* . . . 104*n*, whose non-critical path is removed, will have the opportunity to re-establish the non-critical priority logical path once again. In certain embodiments, the path priority application 114 sends the state change notification 206 to host 104*a* . . . 104*n*.

In certain embodiments, the path priority application 114 automatically re-establishes the non-critical priority logical path once again. For example, once the work associated with the new logical path is complete, that logical path is automatically removed and the previous logical path that was removed to free up additional logical path resources is established again by the host 104. Hence, the path priority application 114 may dynamically manage the logical paths in accordance with the priority schemes 118*a* . . . 118*m* associated with the logical path resources 108*a* . . . 108*m*.

Figure 3A:
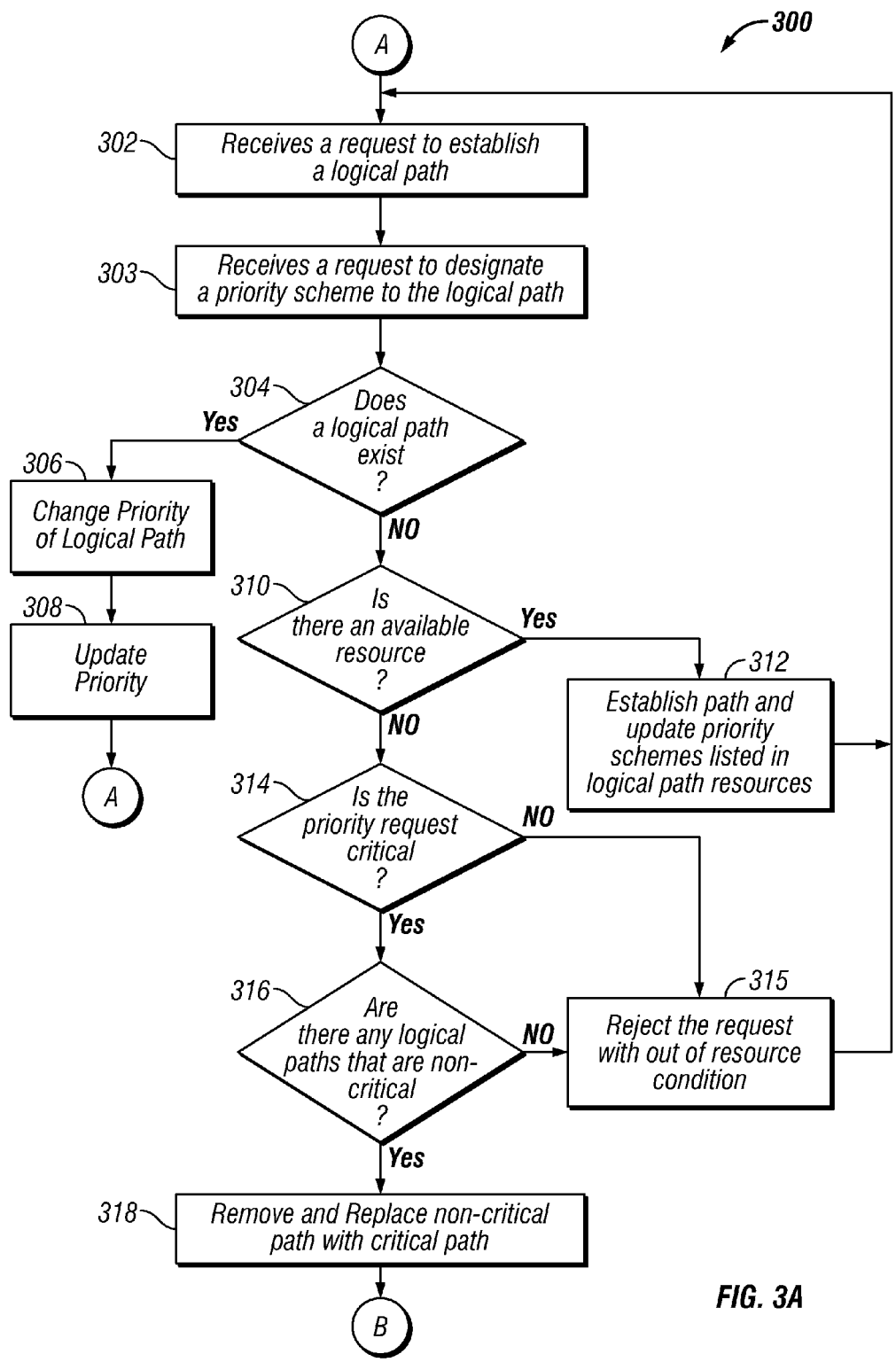
FIGS. 3A, 3B, and 3C a flow diagram illustrating certain embodiments of operation to manage logical path resources.
Figure 3B:
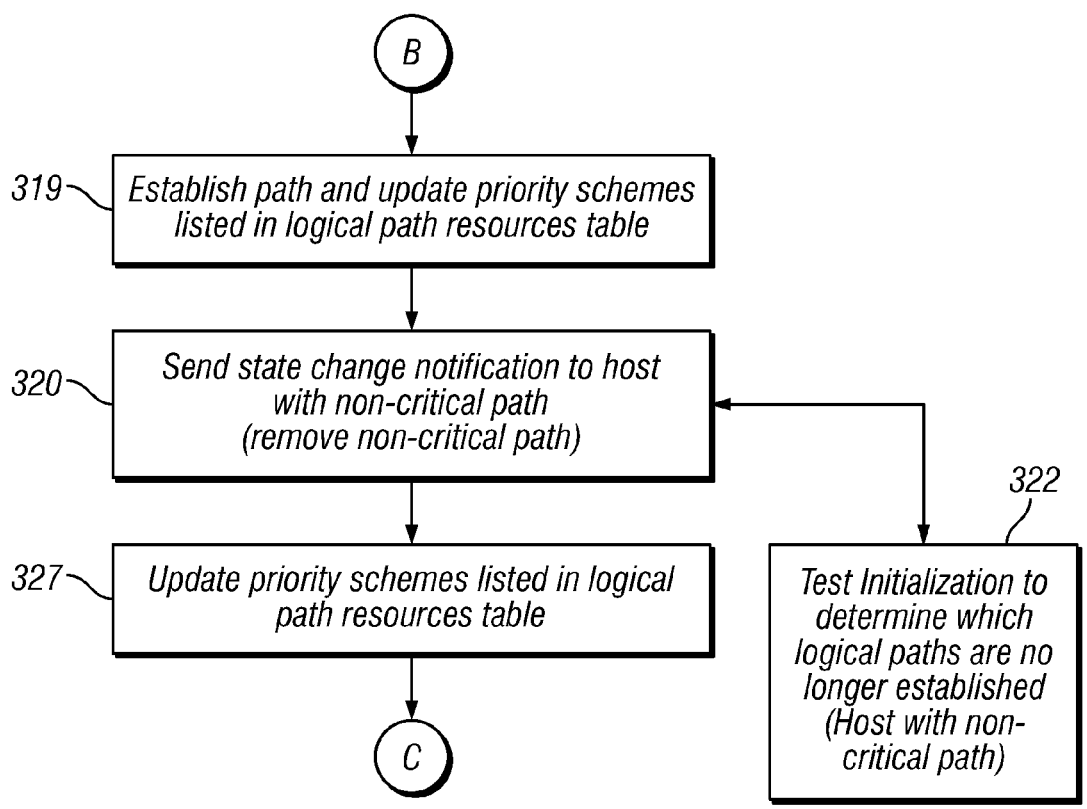
Figure 3C:
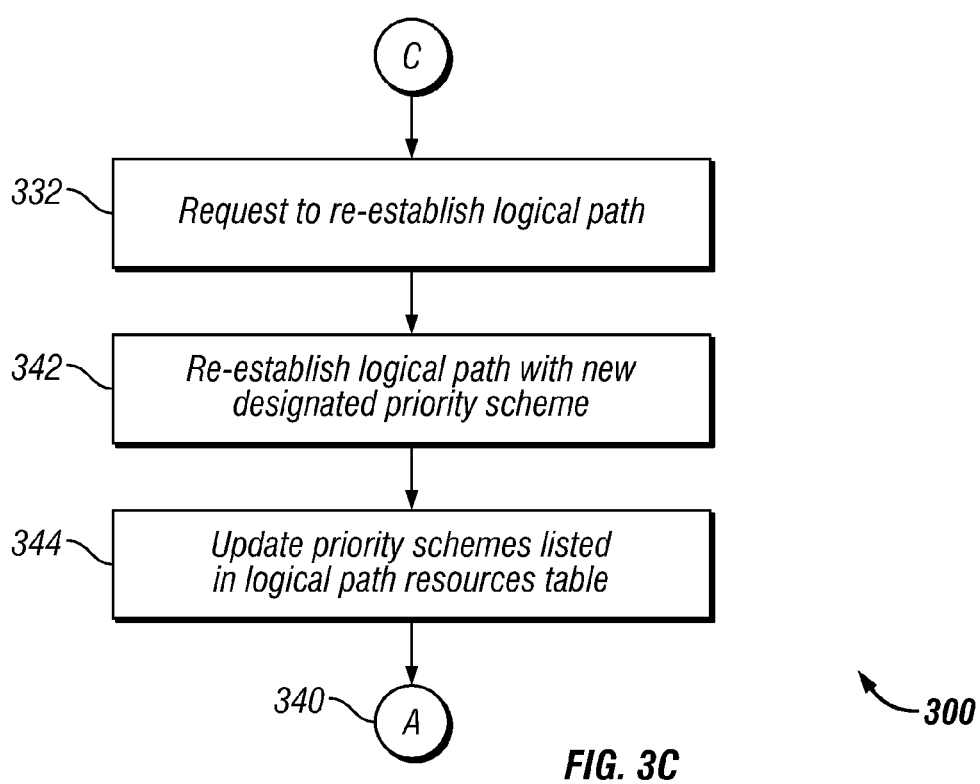

FIGS. 3A-C are schematic flow chart diagrams illustrating certain embodiments of a method 300 to dynamically manage logical path resources. Method 300 may be deployed in a computerized system, such as system 100 in FIG. 1 and/or system 400 in FIG. 4. In certain embodiments, method 300 may be implemented in a storage control unit, such as storage control unit 102. In certain embodiments, method 300 may be implemented in a host, such as host 104*a* . . . 104*n*. In other embodiments, method 300 may be implemented in storage 110.

In certain embodiments, method 300 may be implemented and/or deployed with a computer readable program. The computer readable program may be executed by a processor. The processor may be located in the system 100, such as host 104*a* . . . 104*n*, storage control unit 102, storage 110, and in system 400.

Referring to FIGS. 3A-C, method 300 illustrates an example of operations performed by the path replacement application 114 in the storage control unit 102 comprising the logical path resources 108*a* . . . 108*m*. The storage control unit 102 receives 302 a request from a requestor to establish a logical path. For example, a requestor, such as host 104*a* . . . 104*n* (via host application 112*a* . . . 112*n*), sends an "establish logical path" request 200 to the storage control unit 102, where the "establish logical path" request 200 seeks to access a logical path resources 108*a* . . . 108*m* of the storage control unit 102.

The storage control unit 102 receives 303 a request from a requestor to designate a priority scheme to a logical path. For example, a requestor, such as host 104*a* . . . 104*n* (via host application 112*a* . . . 112*n*), sends a "designate logical path priority" request 202 that includes a priority scheme 118*a* . . . 118*m* to be specified with or given to a logical path being accessed.

The storage control unit 102 via path priority application 114 determines 304 whether a logical path exists. For example, the path priority application 114 may check or refer to the logical path resources table 116 to determine whether the logical path was previously established. If there is an existing logical path, the path priority application 114 changes 306 the priority 120 of the logical path and updates 308 the priority scheme 118a . . . 118m associated with or given to the logical path resources 108a . . . 108m in the logical path resources table 116. Method 300 proceeds to step A where the storage control unit 102 receives another request for a logical path from a requestor, such as a host 104a . . . 104n.

In certain embodiments, depending on the priority 120 already designated with the priority scheme 118, the path priority application 114 changes the priority 120 to the designated priority scheme 118 specified. For example, if the designated priority scheme 118 specified is normal priority 120, and the already designated priority scheme 118 has a non-critical priority 120 specified, the path priority application 114 changes the non-critical priority of the logical path to the normal priority 120.

If a logical path does not exist (i.e., not previously established), the path priority application 114 determines 310 if there is an available resources (e.g., logical path resources 108a . . . 108m). If there is an available resource, the storage control unit 102 (e.g., via path priority application 114) establishes 312 a logical path and updates the priority scheme 118a . . . 118m specified with the logical path resources 108a . . . 108m in the logical path resources table 116.

If, for example, there are no available resources (e.g., logical path resources 108a . . . 108m), the path priority application 114 determines 314 if the host 104a . . . 104n requesting to establish a logical path has designated or provided a priority scheme 118 having a priority 120 of critical. If the priority 120 is not critical, the storage control unit 102 rejects 315 the request to establish a logical path from the requestor (e.g., host 104a . . . 104n) with an "out of resource" condition.

If the priority 120 is critical, the path priority application 114 determines 316 if there are any logical paths listed in the logical path resources table 116 with a priority 120 of non-critical. If there are no logical path resources 108a . . . 108m having a priority scheme 118a . . . 118m specified as non-critical priority 120, the storage control unit 102 rejects 315 the request with an "out of resource" condition. If there is a logical path resources 108a . . . 108m having a priority scheme 118 a . . . 118m specified as non-critical priority 120, the path apriority application 114 removes 318 the non-critical path and replaces 318 it with the new critical path. The path priority application 114 establishes 319 the new critical path with the host 104a . . . 104n designating a priority scheme 118 to the logical path of critical priority 120 and updates 319 the information (e.g., priority schemes 118a . . . 118m) in the logical path resources table 116.

The storage control unit 102 (e.g., via path priority application 114) sends 320 a state change notification 206 to the host 104a . . . 104n with the non-critical path that the non-critical path is removed. The host 104a . . . 104n with the non-critical path removed performs or drives a test initialization to determine 322 which logical paths are no longer established.

The path priority application 114 automatically updates 327 the priority scheme 118 associated with the removed critical path to a priority scheme 118 having a priority 120 of non-critical in the logical path resources table 116. The previous logical path resources 108 having the critical path is now associated with a logical path having a priority scheme 118 of non-critical in the logical path resources table 116.

In certain embodiments, the storage control unit 102 receives 332 a request to re-establish logical path from the previously removed host 104a . . . 104n. The path priority application 114 re-establishes 342 the logical path with newly specified priority scheme 118. The path priority application 114 updates 344 the information (e.g., priority scheme) listed in the logical path resources table 116.

In certain embodiments, the host 104a . . . 104n with the previous non-critical path may designate a new priority scheme 118 to be given to previous removed non-critical path. For example, if host 104b is reestablishing the previously removed non-critical logical path, host 104b may designate a different priority 120 (e.g., normal, critical) to the non-critical path previously removed. When this occurs, the path priority application 114 updates 344 the logical path resources table 116 with the new designation and reestablishes 342 the logical path.

The described techniques may be implemented as a method, apparatus or article of manufacture involving software, firmware, micro-code, hardware and/or any combination thereof. The term "article of manufacture" as used herein refers to program instructions, code and/or logic implemented in circuitry [e.g., an integrated circuit chip, Programmable Gate Array (PGA), ASIC, etc.] and/or a computer readable medium (e.g., magnetic storage medium, such as hard disk drive, floppy disk, tape), optical storage (e.g., CD-ROM, DVD-ROM, optical disk, etc.), volatile and non-volatile memory device [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 4:
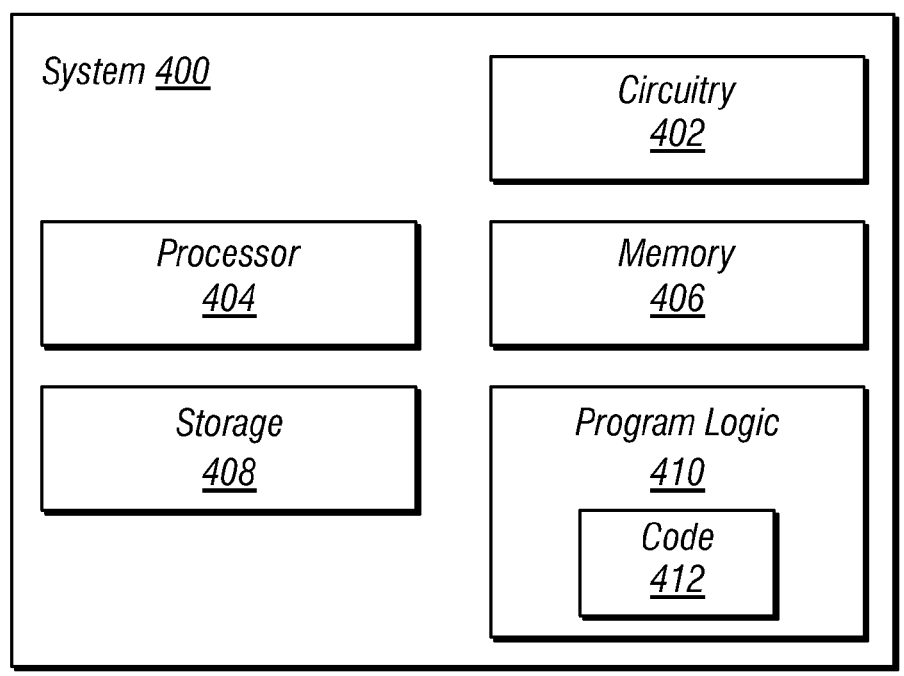
FIG. 4 is a block diagram illustrating a system in which certain embodiments are implemented.

FIG. 4 illustrates a block diagram of a system 400 in which certain embodiments may be implemented. In certain embodiments, the storage control unit 102 and the hosts 104a . . . 104n may be implemented in accordance with the system 400. The system 400 may include circuitry 402 that may in certain embodiments include a processor 404. The system 400 may also include a memory 406 (e.g., a volatile memory device), and storage 408. Certain elements of the system 400 may or may not be found in the storage control unit 102 or the hosts 104a . . . 104n. The storage 408 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 408 may comprise an internal storage device, an attached storage device and/or a network accessible storage device. The system 400 may include program logic 410 including code 412 that may be loaded into the memory 406 and executed by the processor 404 or circuitry 402. In certain embodiments, the program logic 410 including code 412 may be stored in the storage 408. In certain other embodiments, the program logic 410 may be implemented in the circuitry 402. Therefore, while FIG. 4 shows the program logic 410 separately from the other elements, the program logic 410 may be implemented in the memory 406 or the circuitry 402.

Certain embodiments as described and illustrated in FIGS. 1-4 may be directed to a method for deploying computing instruction by a person or automated processing integrating computer-readable code into a computing system (e.g., system 100), where the code in combination with the computing system is enabled to perform the operations of the described embodiments, as illustrated in FIGS. 1-4. In certain embodiments different storage systems may be used in the computing environment, such as Redundant Array of Independent Disks (RAID), just a bunch of disks (JBOD), Direct Access Storage Device (DASD), tape, etc.

At least certain of the operations of FIGS. 1-3 may be performed in parallel as well as sequentially. In alternative embodiments, certain of the operations may be performed in a different order, modified or removed.

Furthermore, many of the software and hardware components have been described in separate modules, operations, or applications for purposes of illustration. Such components may be integrated into a fewer number of components or divided into a larger number of components. Additionally, certain operations described as performed by a specific component may be performed by other components.

The data structures and components shown or referred to in FIGS. 1-4 are described as having specific types of information. In alternative embodiments, the data structures and components may be structured differently and have fewer, more or different fields or different functions than those shown or referred to in the figures.

In certain embodiments, as illustrated in FIGS. 1-4, systems 100 and 400 may include the method 300 for providing a logical paths priority scheme when a logical path is established. In these systems (e.g., 100 and 400), a requestor (e.g., host 102) may perform or request a replacement of a logical path having a designated low priority with a logical path having a higher priority. The replaced low priority logical path may belong to the same requestor (e.g., host 102a . . . 102n) that replaced the low priority logical path or to another host. In systems 100 and 400, the replacement of a low priority logical path with a high priority path may occur when a maximum number of logical paths per port are reached.

Additionally, in certain embodiments, a receiver (e.g., storage control unit 102) may automatically manage the logical paths by adding, removing, and replacing existing logical path resources with specified priority schemes with new priority schemes. In certain embodiments, the receiver may change the priority of the logical path it owns from logical path with a high priority to logical path with a low priority. The requestor may resend the established logical path for the new logical path that failed to be established due to "out of resources" state.

In certain embodiments, a requestor, such as host 104a . . . 104n, may establish communication with logical path resources 108a . . . 108m. The receiver, such as storage control unit 102 may add, remove, delete, or otherwise modify logical path resources 108a . . . 108m. In certain embodiments, a receiver may correspond to a storage control unit, such as storage control unit 102 because it receives a request for a configuration of logical path resources 108a . . . 108m. Likewise, in certain embodiments, a requestor may correspond to a host 102a . . . 102n because it is sending the request to establish a logical path.

Therefore, the foregoing description of the embodiments has been presented for the purposes of illustration and description. It is not intended to be exhaustive or to limit the embodiments to the precise form disclosed. Many modifications and variations are possible in light of the above teaching.

The invention claimed is:

1. A method for dynamically managing logical path resources in a storage system comprising a processor, the method comprising:
   establishing, by the processor, a new logical path;
   designating, by the processor, a priority scheme to the new logical path, the designated priority scheme comprising one of a plurality of priorities comprising a critical priority, a normal priority, and a non-critical priority;
   determining, by the processor, an availability of a logical path based on a comparison of the designated priority scheme and a priority of a current logical path, said determining comprising:
      determining that the logical path resource is available if the designated priority scheme is the critical priority and the current logical path includes the non-critical priority,
      determining that the logical path resource is unavailable if the designated priority scheme is the non-critical priority or the normal priority, and
      determining that the logical path resource is unavailable if the current logical path includes the critical priority or the normal priority such that the logical path resource is unavailable to the new logical path when the designated priority is critical and the current logical path includes the critical priority or the normal priority;
   performing a path priority operation based on the availability of logical path resource; and
   updating information associated with logical path resources in a logical path resource table based on performing the path priority operation.

2. The method of claim 1, wherein performing the path priority operation comprises replacing the current logical path with the new logical path when the designated priority scheme is the critical priority and the current logical path includes the non-critical priority.

3. The method of claim 2, wherein updating the information comprises updating the logical path resource table to reflect that the current logical path has been replaced by the new logical path.

4. The method of claim 1, wherein performing the path priority operation comprises maintaining the current logical path and transmitting a rejection indication to the requestor when the designated priority scheme is the non-critical priority or the normal priority.

5. The method of claim 4, wherein updating the information comprises updating the logical path resource table to reflect that the current logical path has been maintained.

6. The method of claim 1, wherein performing the path priority operation comprises maintaining the current logical path and transmitting a rejection indication to the requestor when the current logical path includes the critical priority or the normal priority.

7. The method of claim 6, wherein updating the information comprises updating the logical path resource table to reflect that the current logical path has been maintained.

8. A system for dynamically managing logical path resources in a storage system comprising a processor, the method comprising:
a memory device configured for storing a management module; and
a processor coupled to the memory, the processor, when executing the management module is configured for:
establishing a new logical path,
designating a priority scheme to the new logical path, the designated priority scheme comprising one of a plurality of priorities comprising a critical priority, a normal priority, and a non-critical priority,
determining an availability of a logical path based on a comparison of the designated priority scheme and a priority of a current logical path, said determining comprising:
determining that the logical path resource is available if the designated priority scheme is the critical priority and the current logical path includes the non-critical priority,
determining that the logical path resource is unavailable if the designated priority scheme is the non-critical priority or the normal priority, and
determining that the logical path resource is unavailable if the current logical path includes the critical priority or the normal priority such that the logical path resource is unavailable to the new logical path when the designated priority is critical and the current logical path includes the critical priority or the normal priority;
performing a path priority operation based on the availability of logical path resource, and
updating information associated with logical path resources in a logical path resource table based on performing the path priority operation.

9. The system of claim 8, wherein, when performing the path priority operation, the processor is further configured for replacing the current logical path with the new logical path when the designated priority scheme is the critical priority and the current logical path includes the non-critical priority.

10. The system of claim 9, wherein, when updating the information, the processor is further configured for updating the logical path resource table to reflect that the current logical path has been replaced by the new logical path.

11. The system of claim 8, wherein, when performing the path priority operation, the processor is further configured for maintaining the current logical path and transmitting a rejection indication to the requestor when the designated priority scheme is the non-critical priority or the normal priority.

12. The system of claim 11, wherein, when updating the information, the processor is further configured for updating the logical path resource table to reflect that the current logical path has been maintained.

13. The system of claim 8, wherein, when performing the path priority operation, the processor is further configured for maintaining the current logical path and transmitting a rejection indication to the requestor when the current logical path includes the critical priority or the normal priority.

14. The system of claim 13, wherein, when updating the information, the processor is further configured for updating the logical path resource table to reflect that the current logical path has been maintained.

15. A computer program product comprising a computer-readable memory including program code embodied therein for dynamically managing logical path resources in a storage system comprising a processor, the computer program product comprising:
computer code for establishing, by the processor, a new logical path;
computer code for designating, by the processor, a priority scheme to the new logical path, the designated priority scheme comprising one of a plurality of priorities comprising a critical priority, a normal priority, and a non-critical priority;
computer code for determining, by the processor, an availability of a logical path based on a comparison of the designated priority scheme and a priority of a current logical path, said computer code for determining comprising:
computer code for determining that the logical path resource is available if the designated priority scheme is the critical priority and the current logical path includes the non-critical priority,
computer code for determining that the logical path resource is unavailable if the designated priority scheme is the non-critical priority or the normal priority, and
computer code for determining that the logical path resource is unavailable if the current logical path includes the critical priority or the normal priority such that the logical path resource is unavailable to the new logical path when the designated priority is critical and the current logical path includes the critical priority or the normal priority;
computer code for performing a path priority operation based on the availability of logical path resource; and
computer code for updating information associated with logical path resources in a logical path resource table based on performing the path priority operation.

16. The computer program product of claim 15, wherein the computer code for performing the path priority operation comprises computer code for replacing the current logical path with the new logical path when the designated priority scheme is the critical priority and the current logical path includes the non-critical priority.

17. The computer program product of claim 16, wherein the computer code for updating the information comprises computer code for updating the logical path resource table to reflect that the current logical path has been replaced by the new logical path.

18. The computer program product of claim 15, wherein the computer code for performing the path priority operation comprises:
computer code for maintaining the current logical path; and
computer code for transmitting a rejection indication to the requestor when the designated priority scheme is the non-critical priority or the normal priority.

19. The computer program product of claim 18, wherein the computer code for updating the information comprises computer code for updating the logical path resource table to reflect that the current logical path has been maintained.

20. The computer program product of claim 15, wherein:
the computer code for performing the path priority operation comprises:
computer code for maintaining the current logical path, and
computer code for transmitting a rejection indication to the requestor when the current logical path includes the critical priority or the normal priority; and
the computer code for updating the information comprises computer code for updating the logical path resource table to reflect that the current logical path has been maintained.

* * * * *